US011377110B2

(12) United States Patent
Yokoyama et al.

(10) Patent No.: US 11,377,110 B2
(45) Date of Patent: Jul. 5, 2022

(54) MACHINE LEARNING DEVICE

(71) Applicant: TOYOTA JIDOSHA KABUSHIKI KAISHA, Toyota (JP)

(72) Inventors: Daiki Yokoyama, Gotemba (JP); Hiroshi Oyagi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/497,168

(22) Filed: Oct. 8, 2021

(65) Prior Publication Data

US 2022/0111850 A1    Apr. 14, 2022

(30) Foreign Application Priority Data

Oct. 12, 2020  (JP) .............................. JP2020-171862

(51) Int. Cl.
*B60W 40/00*   (2006.01)
*B60W 40/02*   (2006.01)
*G06N 20/00*   (2019.01)
*H04W 4/46*    (2018.01)
*G06K 9/62*    (2022.01)

(52) U.S. Cl.
CPC ........... *B60W 40/02* (2013.01); *G06K 9/6256* (2013.01); *G06N 20/00* (2019.01); *H04W 4/46* (2018.02); *B60W 2555/20* (2020.02)

(58) Field of Classification Search
CPC .... B60W 40/02; B60W 2555/20; H04W 4/46; G06N 20/00; G06K 9/6256
USPC ....................................................... 701/300
See application file for complete search history.

(56) References Cited

U.S. PATENT DOCUMENTS

| | | | |
|---|---|---|---|
| 2018/0322711 A1* | 11/2018 | Weimerskirch | G07C 5/0808 |
| 2019/0220003 A1* | 7/2019 | Sharma | G06N 7/005 |
| 2019/0311262 A1 | 10/2019 | Nagasaka et al. | |
| 2020/0285243 A1 | 9/2020 | Morita et al. | |
| 2021/0380127 A1* | 12/2021 | Woo | B60W 50/0205 |

FOREIGN PATENT DOCUMENTS

| | | |
|---|---|---|
| CN | 111445694 A | 7/2020 |
| JP | 2002-215646 A | 8/2002 |
| JP | 2009-134470 A | 6/2009 |
| JP | 2019-183698 A | 10/2019 |
| JP | 2020-144775 A | 9/2020 |

\* cited by examiner

*Primary Examiner* — Tyler J Lee
*Assistant Examiner* — Tiffany P Ohman
(74) *Attorney, Agent, or Firm* — Dinsmore & Shohl LLP (57) ABSTRACT

A machine learning device training a learning model unique to a vehicle is provided with: a processor configured to use training data sets including values of state parameters detected by detectors provided at the vehicle, to train the learning model; and if an abnormality occurs in values of a state parameter detected by a detector, acquire values of the state parameter, where an abnormality has occurred, detected by another vehicle under conditions matching detection conditions when the values of the state parameter included in the training data sets were detected by the detector. If an abnormality occurs in values of the state parameter detected by the detector, the training part uses training data sets including values acquired from another vehicle by the parameter value acquiring part, instead of the values of the state parameter where an abnormality has occurred detected by the detector, to train the leaning model.

5 Claims, 7 Drawing Sheets

MACHINE LEARNING DEVICE

CROSS-REFERENCE TO RELATED APPLICATIONS

This application claims priority to Japanese Patent Application No. 2020-171862 filed on Oct. 12, 2020, the entire contents of which are herein incorporated by reference.

FIELD

The present disclosure relates to a machine learning device for training a learning model unique to a vehicle.

BACKGROUND

It is known to acquire values of state parameters relating to a vehicle and train a learning model by using the acquired values of the state parameters as training data sets (for example, JP 2019-183698 A). In particular, in JP 2019-183698 A, it is proposed to train a learning model outputting a temperature of an exhaust purification catalyst, based on training data sets including values of an engine rotational speed, engine load factor, temperature of the exhaust purification catalyst, etc.

SUMMARY

For example, in the case where the values of state parameters which are parts of the training data sets are detected by sensors, if an abnormality occurs in a sensor, it would not be possible to accurately detect the values of that state parameter. In the case where that in this way an abnormality occurs in the values of a state parameter which are parts of training data sets, if training the learning model by using such training data sets, it would not be possible to suitably train the learning model.

In consideration of the above problem, an object of the present disclosure is to provide a machine learning device able to suitably train a learning model even if an abnormality occurs in values of a state parameter which are parts of training data sets for training the learning model.

The present disclosure has as its gist the following.

(1) A machine learning device training a learning model unique to a vehicle, the machine learning device comprising:
a training part which uses training data sets including values of state parameters detected by detectors provided at the vehicle, to train the learning model; and
a parameter value acquiring part which, if an abnormality occurs in values of a state parameter detected by a detector, acquires values of the state parameter where an abnormality has occurred detected by another vehicle under conditions matching detection conditions when the values of the state parameter included in the training data sets were detected by the detector,
wherein if an abnormality occurs in values of the state parameter detected by the detector, the training part uses training data sets including values acquired from another vehicle by the parameter value acquiring part, instead of the values of the state parameter where an abnormality has occurred detected by the detector, to train the leaning model.

(2) The machine learning device according to above (1), wherein
the machine learning device is provided in the vehicle, and
the parameter value acquiring part acquires values of the state parameter, where the abnormality occurs, detected by the other vehicle by vehicle-vehicle communication with the other vehicle or by communication with a server able to communicate with the other vehicle.

(3) The machine learning device according to above (1), wherein
the machine learning device is provided at a server able to communicate with the vehicle and the other vehicle, and further comprises a model transmitting part transmitting information of the learning model trained by the training part to the vehicle,
the parameter value acquiring part acquires, from the other vehicle, values of the state parameter where the abnormality occurs detected by the other vehicle, by communication between the other vehicle and the server, and
the training part uses training data sets including values of a state parameter where the abnormality occurs acquired from the other vehicle and values of other state parameter relating to the vehicle, besides the state parameter where the abnormality occurs, transmitted from the vehicle by communication between the vehicle and the server, to train the learning model.

(4) The machine learning device according to any one of above (1) to (3), wherein the state parameter where the abnormality occurs is a physical quantity with a small difference between vehicles than other state parameters used in the training data sets, under the same detection conditions.

(5) The machine learning device according to any one of above (1) to (4), wherein the state parameter where the abnormality occurs is a state parameter relating to an external environment of the vehicle.

(6) The machine learning device according to above (5), wherein the state parameter where the abnormality occurs includes at least one of a temperature, humidity, and air pressure of an atmosphere of the surroundings of the vehicle.

(7) The machine learning device according to any one of above (1) to (6), wherein the detection conditions include a time and place where values of the state parameter constituting parts of the training data sets of the vehicle were detected by the detector.

DETAILED DESCRIPTION

Below, referring to the drawings, embodiments of the present disclosure will be explained in detail. Note that, in the following explanation, similar component elements will be assigned the same reference notations.

First Embodiment

Configuration of Machine Learning System

Figure 1:
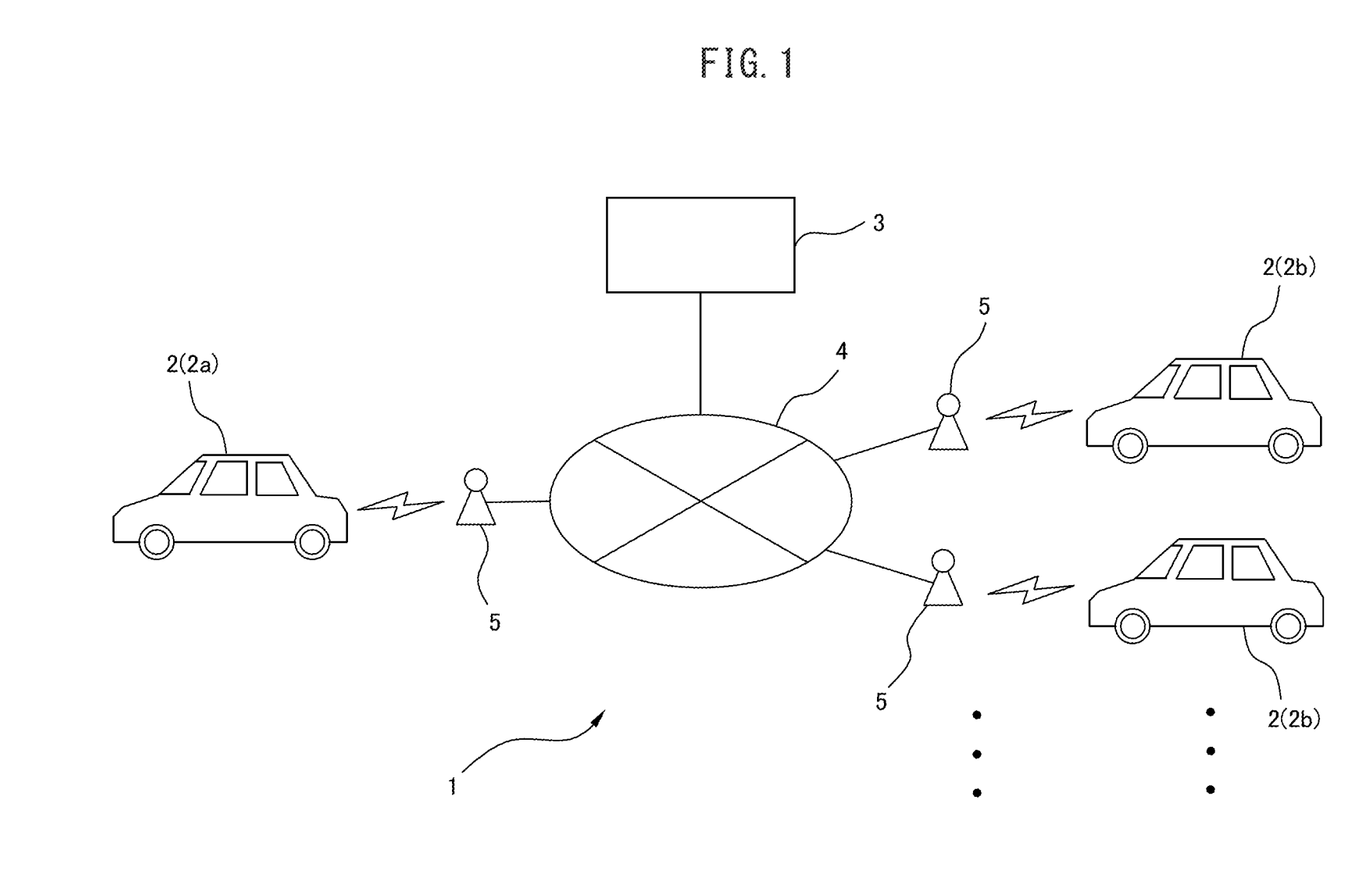
FIG. 1 is a schematic view of the configuration of a machine learning system according to a first embodiment.

First, referring to FIGS. 1 to 7, a machine learning system 1 according to a first embodiment will be explained. FIG. 1 is a schematic view of the configuration of the machine learning system 1 according to the first embodiment. The machine learning system 1 trains a learning model unique to each vehicle using state parameters showing states of the vehicle.

As shown in FIG. 1, the machine learning system 1 is provided with a plurality of vehicles 2 and a server 3 able to communicate with each other. Each of the plurality of vehicles 2 and the server 3 are configured to be able to communicate with each other through a communication network 4 configured by optical communication lines, etc., and a wireless base station 5 connected with the communication network 4 through a gateway (not shown). The communication between the vehicles 2 and wireless base station 5 is communication compliant with any communication protocol. Note that, in the following explanation, the one vehicle using a learning model trained by the machine learning system 1 among the vehicles 2 will be referred to as the "ego vehicle 2a", and vehicles other than the ego vehicle 2a will be referred to as "other vehicles 2b".

Figure 2:
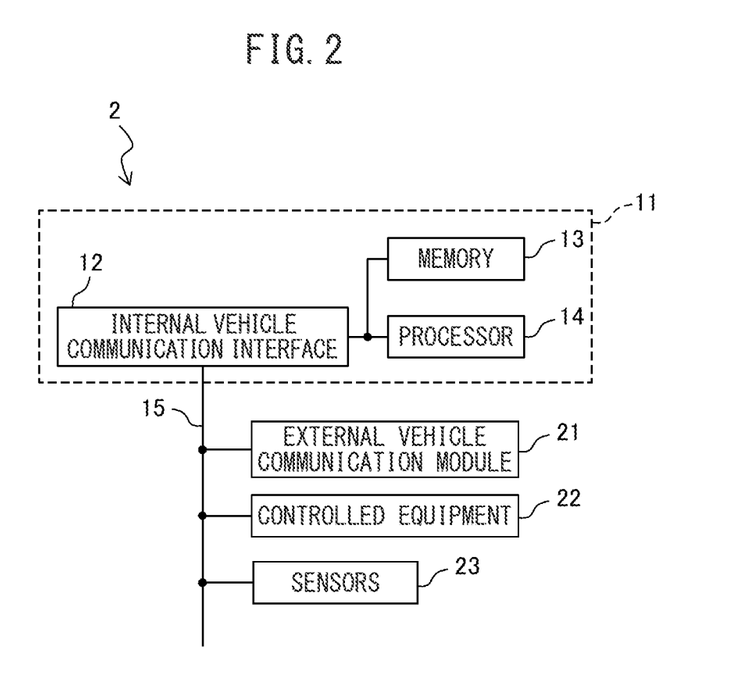
FIG. 2 is a view schematically showing a hardware configuration of a vehicle.

FIG. 2 is a view schematically showing the hardware configuration of a vehicle 2. As shown in FIG. 2, the vehicle 2 is provided with an electronic control unit (ECU) 11. The ECU 11 has an internal vehicle communication interface 12, a memory 13, and a processor 14. The internal vehicle communication interface 12 and the memory 13 are connected to the processor 14 through signal wires. Note that, in the present embodiment, the vehicle 2 is provided with a single ECU 11, but it may also be provided with a plurality of ECUs divided for different functions.

The internal vehicle communication interface 12 has an interface circuit for connecting the ECU 11 to an internal vehicle network 15 compliant with the CAN (controller area network) or another standard. The ECU 11 communicates with other vehicle-mounted equipment through the internal vehicle communication interface 12.

The memory 13 is one example of a storage part for storing data. The memory 13, for example, has a volatile semiconductor memory (for example, RAM) and nonvolatile semiconductor memory (for example, ROM). The memory 13 stores computer programs for performing various processing at the processor 14 and various data used when various processing is performed by the processor 14, etc. Therefore, the memory 13 stores a learning model.

The processor 14 has one or more CPUs (central processing units) and their peripheral circuits. The processor 14 may further have a GPU (graphics processing unit) or a processing circuit such as a logic unit or arithmetic unit. The processor 14 performs various processing based on computer programs stored in the memory 13. Therefore, if values of input parameters of the learning model are input, the processor 14 performs processing according to the learning model and outputs a value of an output parameter.

Figure 3:
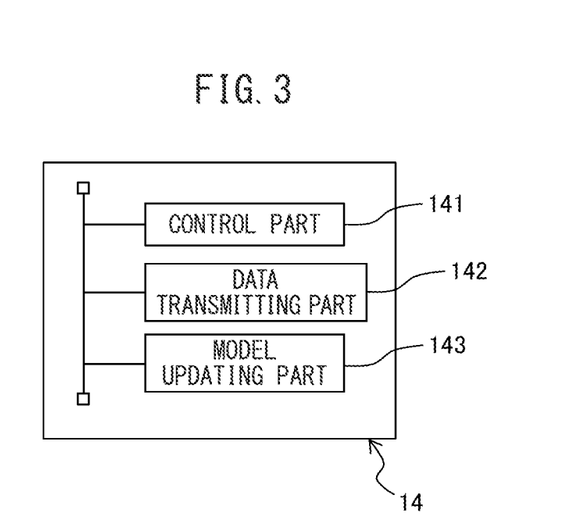
FIG. 3 is a functional block diagram of a processor of an ego vehicle.

FIG. 3 is a functional block diagram of the processor 14 of the ego vehicle 2a. As shown in FIG. 3, the processor 14 is provided with a control part 141 using a learning model to control controlled equipment 22 of the ego vehicle 2a, a data transmitting part 142 transmitting a training data set used for training the learning model to the server 3, and a model updating part 143 updating the learning model used in the control part 141. These functional blocks of the processor 14 are, for example, functional modules realized by computer programs operating on the processor 14. Alternatively, these functional blocks of the processor 14 may be dedicated processing circuits provided at the processor 14. Details of the functional blocks of the processor 14 of the ego vehicle 2a will be explained later.

Further, as shown in FIG. 2, the vehicle 2 is further provided with an external vehicle communication module 21, a plurality of controlled equipment 22, and a plurality of sensors 23. The external vehicle communication module 21, controlled equipment 22, and sensors 23 are connected to the ECU 11 through the internal vehicle network 15.

The external vehicle communication module 21 is one example of a communicating part for communicating with equipment outside the vehicle. The external vehicle communication module 21 is, for example, equipment for communicating with the server 3 and other vehicles 2b. The external vehicle communication module 21, for example, includes a data communication module (DCM). The data communication module communicates with the server 3 through a wireless base station 5 and communication network 4.

The controlled equipment 22 is equipment for performing various control operations of a vehicle 2. Specifically, the controlled equipment 22, for example, includes a drive actuator of a throttle valve for adjusting an opening degree of a throttle valve provided in an intake passage of an internal combustion engine, an injector supplying fuel to a combustion chamber of an internal combustion engine, a drive actuator of an EGR valve controlling an EGR rate of the internal combustion engine, a blower of an air-conditioner, a drive actuator of an air mix door controlling a flow of air of the air-conditioner, etc. These controlled equipment 22 are connected to the ECU 11 through the internal vehicle network 15 and are made to operate in accordance with drive signals from the ECU 11.

The sensors 23 are examples of detectors for detecting values of various state parameters (state quantities) relating to a vehicle 2. The sensors 23 include, for example, an air flow sensor for detecting a flow of intake air supplied to the internal combustion engine, an injection pressure sensor for detecting a fuel injection pressure from an injector of the internal combustion engine, an exhaust temperature sensor for detecting a temperature of the exhaust gas, an input detector sensor for detecting input of a driver at, for example, a touch panel, a self-position sensor for detecting a self-position of the vehicle 2 (for example, GPS), etc. Furthermore, the sensors 23 include, for example, an outside air temperature sensor for detecting a temperature of the air in the surroundings of the vehicle 2 (outside air temperature), an outside air humidity sensor for detecting a humidity of the air in the surroundings of the vehicle 2 (outside air humidity), an atmospheric pressure sensor for detecting an atmospheric pressure in the surroundings of the vehicle 2, an internal vehicle temperature sensor for detecting a temperature inside a cabin of the vehicle 2 (internal cabin temperature), an internal vehicle humidity sensor for detecting a humidity inside the cabin of the vehicle 2 (internal cabin humidity), a sunlight sensor for detecting an amount of sunlight, etc. These sensors 23 are connected to the ECU 11 through the internal vehicle network 15 and transmit output signals to the ECU 11.

The server 3 is provided at the outside of the vehicle 2, and communicates with the vehicle 2 while it travels through a specific region, through the communication network 4 and wireless base station 5. The server 3 receives various information from the vehicle 2 while it travels through the specific region.

Figure 4:
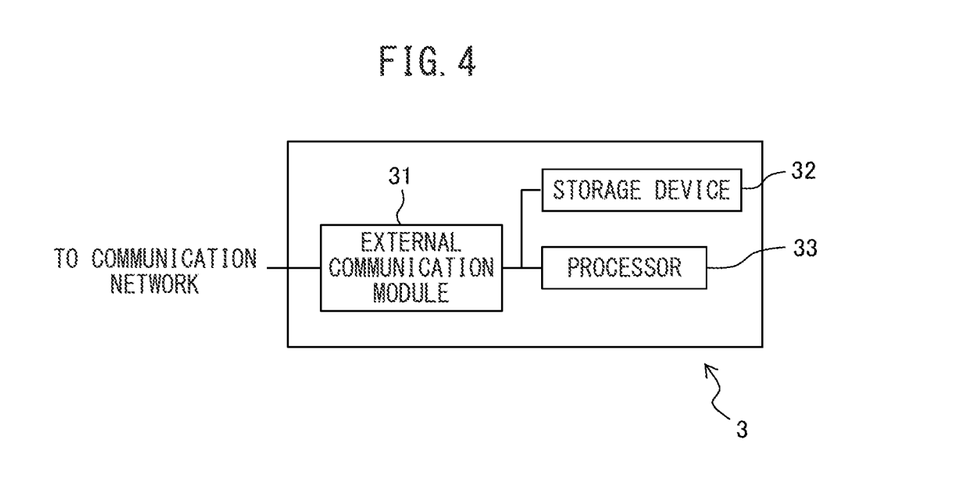
FIG. 4 is a view schematically showing a hardware configuration of a server.

FIG. 4 is a view schematically showing a hardware configuration of the server 3. The server 3, as shown in FIG. 4, is provided with an external communication module 31, storage device 32, and processor 33. Further, the server 3 may have an input device such as a keyboard or mouse, and an output device such as a display.

The external communication module 31 is one example of a communicating part for communicating with equipment other than the server 3. The external communicating module 31 is provided with an interface circuit for connecting the server 3 to the communication network 4. The external communicating module 31 is configured to be able to communicate respectively with the plurality of vehicles 2 through the communication network 4 and wireless base station 5.

The storage device 32 is one example of a storage part for storing data. The storage device 32 is, for example, provided with a hard disk drive (HDD), solid state drive (SSD), or optical storage medium. The storage device 32 stores computer programs for the processor 33 to perform various processing and various data used when the various processing is performed by the processor 33.

The processor 33 has one or more CPUs and their peripheral circuits. The processor 33 may further have a GPU or processing circuit such as a logic unit or arithmetic unit. The processor 33 performs various processing based on computer programs stored in the storage device 32. In the present embodiment, the processor 33 of the server 3 functions as a machine learning device for training a learning model.

Figure 5:
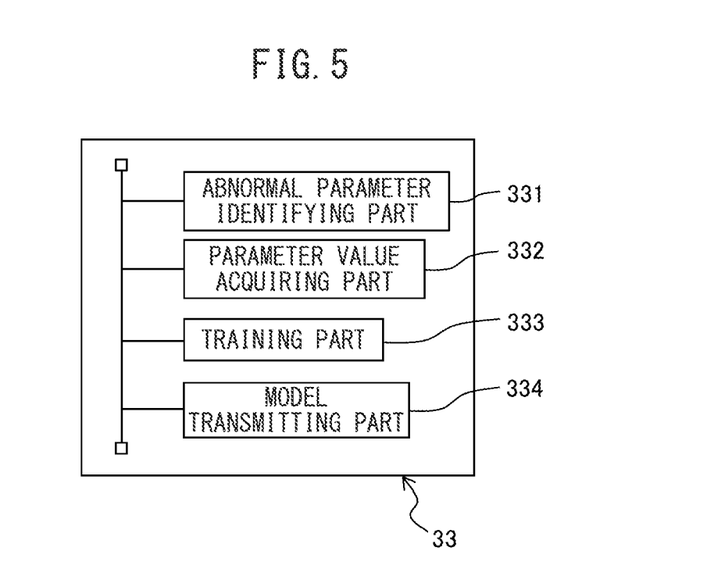
FIG. 5 is a functional block diagram of a processor of the server.

FIG. 5 is a functional block diagram of the processor 33 of the server 3. As shown in FIG. 5, the processor 33 is provided with an abnormal parameter identifying part 331 for identifying a state parameter where an abnormality has occurred among the state parameters forming a training data set transmitted from the ego vehicle 2a, a parameter value acquiring part 332 for acquiring the values of the state parameter where an abnormality has occurred from other vehicles 2b different from the ego vehicle 2a, a training part 333 for training a learning model, and a model transmitting part 334 for transmitting the trained learning model to the ego vehicle 2a. These functional blocks of the processor 33 are, for example, functional modules realized by computer programs operated on the processor 33. Alternatively, these functional blocks of the processor 33 may be dedicated processing circuits provided at the processor 33. Details of the various functional blocks of the processor 33 of the server 3 will be explained later.

Learning Model

Figure 6:
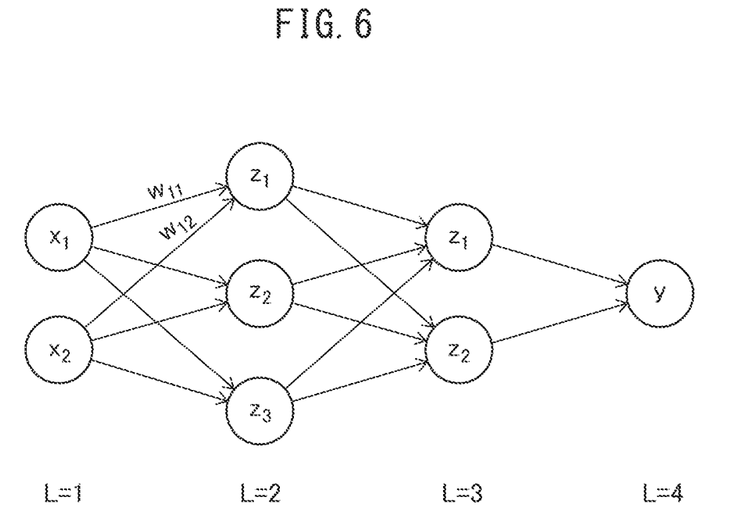
FIG. 6 shows one example of an NN model having a simple configuration.

In the present embodiment, in the control part 141 of the ego vehicle 2a, when controlling controlled equipment 22 mounted in the ego vehicle 2a, a learning model trained by machine learning is used. In the present embodiment, as the learning model, a neural network model (below, referred to as "NN model") is used. Below, referring to FIG. 6, an outline of an NN model will be explained. FIG. 6 shows one example of a NN model having a simple configuration.

The circle marks in FIG. 6 show artificial neurons. The artificial neurons are usually called "nodes" or "units" (in the Description, referred to as "nodes"). In FIG. 6, L=1 shows the input layer, L=2 and L=3 show hidden layers (or intermediate layers), and L=4 shows the output layer.

In FIG. 6, $x_1$ and $x_2$ show the nodes of the input layer (L=1) and the output values from those nodes, while "y" shows the node of the output layer (L=4) and the output value of the same. Similarly, $z_1^{(L=2)}$, $z_2^{(L=2)}$, and $z_3^{(L=2)}$ show the nodes of the hidden layer (L=2) and the output values from those nodes, while $z_1^{(L=3)}$ and $z_2^{(L=3)}$ show the nodes of the hidden layer (L=3) and the output values from those nodes.

At the nodes of the input layer, the inputs are output as they are. On the other hand, at the nodes of the hidden layer (L=2), the output values $x_1$ and $x_2$ of the nodes of the input layer are input, while at the nodes of the hidden layer (L=2), the respectively corresponding weights "w" and biases "b" are used to calculate the sum input values "u". For example, in FIG. 6, the sum input value $u_k^{(L=2)}$ calculated at a node shown by $z_k^{(L=2)}$ (k=1, 2, 3) in the hidden layer (L=2) is calculated by the following equation (M is the number of nodes of the input layer).

$$u_k^{(L=2)} = \sum_{m=1}^{M} (x_m \cdot w_{km}^{(L=2)}) + b_k$$

Next, this sum input value $u_k^{(L=2)}$ is converted by an activation function "f", and is output from a node shown by $z_k^{(L=2)}$ of the hidden layer (L=2) as an output value $z_1^{(L=2)}$ (=f($u_k^{(L=2)}$)). On the other hand, at the nodes of the hidden layer (L=3), the output values $z_1^{(L=2)}$, $z_2^{(L=2)}$, and $z_3^{(L=2)}$ of the nodes of the hidden layer (L=2) are input. At the nodes of the hidden layer (L=3), the respectively corresponding weights "w" and biases "b" are used to calculate the sum input values "u" (=Σz·w+b). The sum input values "u" are similarly converted by an activation function and output from the nodes of the hidden layer (L=3) as the output values $z_1^{(L=3)}$ and $z_2^{(L=3)}$. This activation function is for example a ReLU function σ.

Further, the output values $z_1^{(L=3)}$ and $z_2^{(L=3)}$ of the nodes of the hidden layer (L=3) are input to the node of the output layer (L=4). At the node of the output layer, the respectively corresponding weight "w" and bias "b" are used to calculate the sum input value "u" (Σz·w+b), or only the respectively corresponding weight "w" is used to calculate the sum input value "u" (Σz·w). For example, at the node of the output layer, as an activation function, an identity function is used. In this case, the sum input value "u" calculated at the node of the output layer is output as is, as the output value "y" from the node of the output layer.

In this way, an NN model is provided with an input layer, hidden layers, and an output layer. If one or more input parameters are input to the input layer, one or more output parameters corresponding to the input parameters are output from the output layer.

In the present embodiment, as such a learning model, for example, a model which, when receiving an outside air temperature, amount of intake air, amount of fuel injection, timing of fuel injection, fuel injection pressure, or EGR rate as values of input parameters, outputs a temperature of the exhaust gas as a value of an output parameter, is used. In the control part 141 of the ego vehicle 2a, the temperature of the exhaust gas is output by inputting values of various input parameters detected by the sensors 23 to such a learning model. The control part 141 controls the controlled equipment 22 relating to the internal combustion engine based on the output temperature of the exhaust gas. Here, there is a delay in response in the exhaust temperature sensor for detecting the temperature of the exhaust gas, therefore if controlling the internal combustion engine based on the output of the exhaust temperature sensor, it was not necessarily possible to suitably control the internal combustion engine. As opposed to this, no delay occurs in calculation of the temperature of the exhaust gas using the learning model, therefore it is possible to more suitably control the internal combustion engine by controlling the internal combustion engine using the temperature of the exhaust gas calculated by the learning model.

Alternatively, as such a learning model, for example, a model which outputs a target temperature of an air-conditioner as a value of the output parameter if an outside air temperature, inside vehicle temperature, inside vehicle humidity, and amount of sunlight are input as the values of the input parameters, may be used. In this case, in the control part 141 of the ego vehicle 2a, by inputting values of the different input parameters detected by the sensors 23 into such a learning model, a target temperature of the air-conditioner is output. The ECU 11 controls the controlled equipment 22 relating to the air-conditioner so that the inside vehicle temperature becomes the target temperature output from the learning model.

Note that, various models can be used as the learning model. Therefore, the input parameters may include various state parameters such as the outside air temperature, outside humidity, atmospheric pressure, internal cabin temperature, internal cabin humidity, amount of sunlight, amount of intake air, intake temperature, fuel injection pressure, fuel injection timing, amount of fuel injection, air-fuel ratio, ignition timing, engine cooling water temperature, and supercharging pressure. Further, the output parameter may include various state parameters expressing states of the vehicle such as the temperature of the exhaust purification catalyst, concentration of the NOx in the exhaust gas, engine output torque, and internal cabin humidity.

Basic Training of Learning Model

Next, the machine learning of the above-such learning model (NN model) will be explained. To improve the precision of the NN model, it is necessary to train the NN model. Therefore, in the present embodiment, the training part 333 of the server 3 trains the NN model. First, the training technique of the NN model performed at the training part 333 will be briefly explained.

In training the NN model, training data sets including values of state parameters detected by the sensors 23 provided at the vehicle 2 are used. The training data sets are comprised of combinations of the plurality of measured values of the plurality of input parameters, and the plurality of measured values of at least one output parameter corresponding to these measured values (ground truth data). In the present embodiment, the measured values of the input parameters and the measured values of the output parameters are values detected by the sensors 23 of the ego vehicle 2a or control command values from the ECU 11 to the controlled equipment 22. Further, in the present embodiment, in order for the server 3 to train the NN model, measured values used as training data sets are transmitted from the ego vehicle 2a to the server 3.

The training part 333 of the server 3 preprocesses (normalizes, standardizes, etc.) the training data sets transmitted from the ego vehicle 2a, then trains the NN model. In the training of the NN model, the training part 333, for example, repeatedly updates the weights "w" and biases "b" in the NN model by known error backpropagation so that the difference between the output value of the NN model and the measured value of the output parameter included in the training data sets becomes smaller. As a result, the NN model is trained and a trained NN model is generated. Information of the trained NN model (structure, weights "w", biases "b", etc. of the model) are stored in the storage device 32 of the server and transmitted from the server 3 to the ego vehicle 2a.

Training in Case where Abnormality Occurs in Value of State Parameter

In this regard, if for example a malfunction or other abnormality occurs in a sensor 23 detecting values of a state parameter constituting parts of the training data sets, error will occur in the output of the sensor 23 or the sensor 23 will no longer output a signal. If using the output of a sensor 23 where an abnormality has occurred in this way for training a learning model, it would not be possible to suitably train the learning model.

Therefore, in the present embodiment, if an abnormality has occurred in the values of a state parameter detected by a sensor 23, the values of that state parameter are acquired from another vehicle 2b in the same region as the ego vehicle 2a, and the learning model is trained by using training data sets including the values acquired from the other vehicle 2b, instead of the values of the state parameter detected by the sensor 23. Below, referring to FIG. 7, the training of a learning model in the case where an abnormality has occurred in the values of a state parameter detected by a sensor 23 will be specifically explained.

Figure 7:
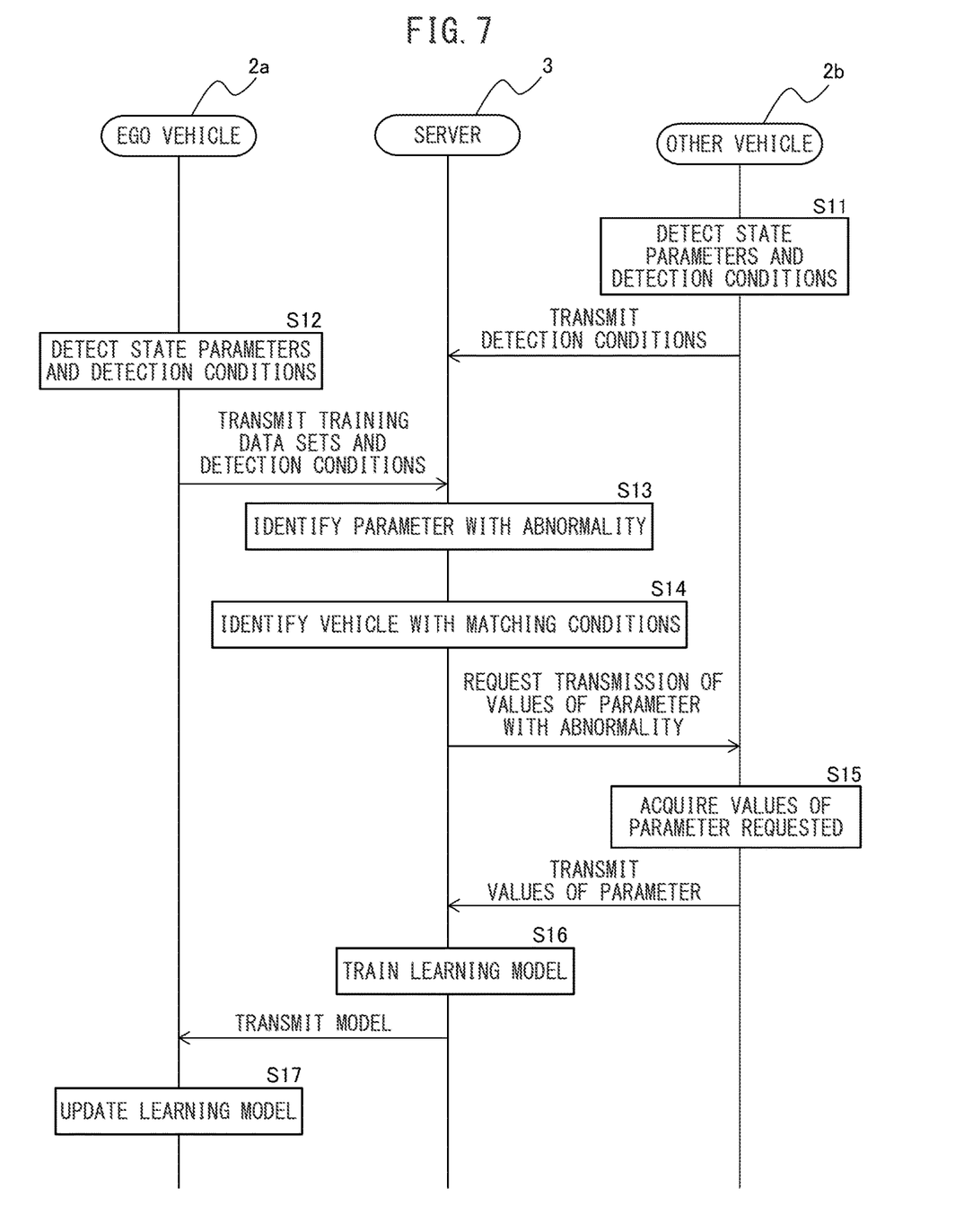
FIG. 7 is an operation sequence diagram of training processing performed by a machine learning system.

FIG. 7 is an operation sequence diagram of training processing performed by the machine learning system 1. In particular, FIG. 7 is an operation sequence when training a learning model which is used when controlling controlled equipment 2a of the ego vehicle 2a, in the case where an abnormality has occurred in an outside air temperature sensor of the ego vehicle 2a.

As shown in FIG. 7, other vehicles 2b periodically detect the values of state parameters including the outside air temperature and the detection conditions at that time (step S11). The values of the state parameters are detected by the sensors 23 of the other vehicles 2b. In particular, among the state parameters, the outside air temperature is detected by the outside air temperature sensors. Further, the detection conditions express the conditions when the values of state parameters are detected by the sensors 23. In the present embodiment, they include the times and places where the values of state parameters are detected. The times when values of state parameters are detected, are acquired from the ECUs 11 of the other vehicles 2b functioning as clocks. Further, the places where the values of state parameters are detected are determined by self-position sensors. Note that, the detection conditions, for example, may also include amounts of rainfall detected by rain sensors, models of vehicles, and various other conditions.

The processors 14 of the other vehicles 2b store the values of the detected state parameters and the detection conditions at which the state parameters were detected, in their memories 13. In addition, the data transmitting parts 142 of the processors 14 of the other vehicles 2b transmit the detection conditions and types of the detected state parameters stored in the memories 13, through their external vehicle communication modules 21 to the server 3, every predetermined time interval. The server 3 stores the received detection conditions and the types of the state parameters in the storage device 32.

On the other hand, the ego vehicle 2a periodically detects the values of state parameters used for training the learning model and the detection conditions at that time (step S12). The values of the state parameters are detected by the sensors 23 of the ego vehicle 2a, while the detection conditions are acquired from the ECU 11 or detected by the sensors 23. Note that, in the example shown in FIG. 7, an abnormality occurs in the outside air temperature sensor of the ego vehicle 2a, therefore a large error arises in the outside air temperature detected by the outside air temperature sensor.

The processor 14 of the ego vehicle 2a stores time series values of the plurality of detected state parameters and the detection conditions under which the values of the state parameters were detected, in its memory 13. In addition, if the number of the values of the state parameters required for training are detected and stored in the memory 13, the data transmitting part 142 of the ego vehicle 2a assembles the time series values of the plurality of state parameters stored in the memory 13, and transmits them as training data sets to the server 3, and transmits the detection conditions of the values of the state parameters to the server 3. The server 3 stores the received training data sets and detection conditions to the storage device 32. Note that, the data transmitting part 142 of the ego vehicle 2a may also transmit the values of state parameters and detection conditions to the server 3 every time these are detected.

If the number of the values of the state parameters required for training are stored as training data sets in the storage device 32, the abnormal parameter identifying part 331 of the server 3 judges if there is any state parameter where an abnormality has occurred in the training data sets and, if there is a state parameter where an abnormality has occurred, identifies that state parameter (step S13). The abnormal parameter identifying part 331 judges that an abnormality has occurred in values of a state parameter, if the values of the state parameter are abnormal values which could never occur (for example, if it is detected that the outside air temperature is more than 50° C. in the winter), if the values of the state parameter are fixed at a certain value (for example, if it is detected that the outside air temperature is fixed to 25° C. throughout the day), and, further, if no signal is output from a sensor and therefore the values of the state parameter are devoid. If it is judged at the abnormal parameter identifying part 331 that there is no state parameter where an abnormality has occurred, the server 3 trains the learning model at the later explained step S16.

Note that, in the present embodiment, the abnormal parameter identifying part 331 of the server 3 identifies a parameter where an abnormality has occurred. However, a parameter where an abnormality has occurred may also be identified by another method. For example, if able to diagnose a malfunction of a sensor 23 mounted in the ego vehicle 2a, the processor 14 of the ego vehicle 2a may also identify a state parameter detected by a sensor 23 diagnosed as malfunctioning, as a state parameter where an abnormality has occurred. In this case, the processor 14 of the ego vehicle 2a functions as the abnormal parameter identifying part 331, and the data transmitting part 142 transmits the type of parameter where an abnormality has occurred to the server 3 in addition to the value of state parameter and detection conditions.

If the state parameter where an abnormality has occurred (below, referred to as an "abnormal state parameter", and which is, in the example shown in FIG. 7, the outside air temperature) is identified by the abnormal parameter identifying part 331, the parameter value acquiring part 332 of the server 3 acquires the values of the abnormal state parameter from another vehicle 2b. In particular, in the present embodiment, the parameter value acquiring part 332 acquires the values of the abnormal state parameter detected by the other vehicle 2b from the other vehicle 2b under conditions matching with the detection conditions when the ego vehicle 2a detected the values of the state parameters constituting the training data sets.

For this reason, if the fact that an abnormality has occurred in a state parameter detected by a sensor 23 is identified, the parameter value acquiring part 332 of the server 3 identifies another vehicle 2b acquiring the values of the abnormal state parameter (step S14). The parameter value acquiring part 332 searches for another vehicle 2b transmitting detection conditions matching the detection conditions when the ego vehicle 2a detected the values of the abnormal state parameter, among the large number of other vehicles 2b transmitting the detection conditions. Specifically, for example, another vehicle 2b which had detected a state parameter at a time and place with the highest match with the time and place where the values of the state parameter contained in the training data sets at the ego vehicle 2a, is identified as another vehicle 2b acquiring the values of the abnormal state parameter.

If identifying another vehicle 2b for acquiring the values of the abnormal state parameter, the parameter value acquiring part 332 requests the other vehicle 2b to transmit the values of the abnormal state parameter (that is, the outside air temperature). In particular, the parameter value acquiring part 332 transmits to the other vehicle 2b, through the external communication module 31, a signal requesting it to transmit the values of the abnormal state parameter detected by the identified other vehicle 2b under detection conditions matching the detection conditions of the training data sets.

If transmission of the values of the abnormal state parameter is requested, the processor 14 of the other vehicle 2b acquires from its memory 13 the values of the abnormal state parameter detected under detection conditions matching the detection conditions of the training data sets (step S15). Further, the processor 14 of the other vehicle 2b transmits the acquired values of the abnormal state parameter through the external vehicle communication module 21 to the server 3. The parameter value acquiring part 332 of the server 3 acquires the values of the abnormal state parameter detected by the other vehicle 2b through communication between the other vehicle 2b and the server 3. Therefore, if an abnormality has occurred in the values of a certain state parameter detected by a sensor 23 (abnormal state parameter), the parameter value acquiring part 332 of the server 3 acquires the values of the abnormal state parameter detected by the other vehicle 2b under conditions matching the detection conditions when the values of the abnormal state parameter included in the training data sets of the ego vehicle 2a were detected by the sensor 23.

The training part 333 of the server 3 uses the training data sets prepared by the ego vehicle 2a and the values of the abnormal state parameter transmitted from the other vehicle 2b to train the learning model (step S16). If it was judged at the abnormal parameter identifying part 331 that there was no state parameter where an abnormality occurred, the training part 333 uses only the training data sets transmitted from the ego vehicle 2a and trains the learning model by the above-mentioned training technique. On the other hand, if an abnormal state parameter is identified at the abnormal parameter identifying part 331, the training part 333 uses training data sets including the values of the abnormal state parameter acquired by the parameter value acquiring part 332 from another vehicle 2b, instead of the values of the abnormal state parameter detected by the sensor 23 of the ego vehicle 2a, so as to train the learning model by the above-mentioned training technique. That is, the training part 333, in this case, uses training data sets including the values of the abnormal state parameter acquired by the parameter value acquiring part 332 from the other vehicle 2b and the values of state parameters, other than the abnormal state parameter, detected by the sensors 23 of the ego vehicle 2a, so as to train the learning model. Specifically, in the present embodiment, instead of the data of the atmospheric temperature detected by the atmospheric temperature sensor of the ego vehicle 2a, the training data sets include the data of the atmospheric temperature acquired by the parameter value acquiring part 332 from another vehicle 2b and include data of other state parameters detected by other sensors of the ego vehicle 2a (for example, air flow sensor or injection pressure sensor) (for example, amount of intake air or fuel injection pressure) or data of other state parameters formed by control commands from the ECU 11 to the controlled equipment 22 (for example, amount of fuel injection or fuel injection timing).

When the training of the learning model has been completed, the training part 333 stores the information of the trained learning model in the storage device 32 of the server 3. Further, when training of the learning model has been completed, the model transmitting part 334 of the server 3 transmits the information of the trained learning model (for example, the updated weights "w" and biases "b") to the ego vehicle 2a.

If receiving information of the trained learning model, the model updating part 143 of the ego vehicle 2a updates the information of the learning model stored in the memory 13 of the ego vehicle 2a (step S17). Due to this, when later using the learning model to control the controlled equipment 22, the control part 141 controls the controlled equipment 22 based on the updated learning model.

Advantageous Effects and Modifications

According to this embodiment, for example, if a malfunction or other abnormality occurs in a sensor 23 of the ego vehicle 2a and thereby an abnormality occurs in the values of a state parameter constituting parts of training data sets, training data sets including the values of the abnormal state parameter detected by another vehicle 2b, instead of the values of the abnormal state parameter where the abnormality occurred, are used to train the learning model. As a result, according to this embodiment, even if there is an abnormality in values of a state parameter detected by a sensor 23 of the ego vehicle 2a, training data sets with relatively accurate values of state parameters are used to train the learning model. Therefore, even if an abnormality occurs in values of a state parameter constituting part of training data sets for training a learning model, it is possible to suitably train the learning model.

Further, in the present embodiment, the learning model is trained in the server 3. Therefore, there is no need for training with a high load of calculation to be performed at the ego vehicle 2a, therefore there is no need for making the processing ability of the processor 14 of the ego vehicle 2a that high and accordingly the manufacturing cost of the ego vehicle 2a can be reduced.

Note that, in the above embodiment, the example is shown of training a learning model if an outside air temperature sensor malfunctions and an abnormality occurs in the outside air temperature detected by the outside air temperature sensor. However, the above-mentioned training technique of a learning model can also be applied to the case where a sensor 23 other than the outside air temperature sensor malfunctions and an abnormality occurs in values of a state parameter other than the outside air temperature.

In particular, the above-mentioned training technique of a learning model can be applied to the case where an abnormality arises in values of a state parameter which, under similar detection conditions, give similar values even if the vehicles 2 differ. Therefore, the above-mentioned training technique of a learning model can be applied when there is an abnormality in values detected by a sensor 23 of the ego vehicle 2a for a state parameter expressing a physical quantity with a smaller difference among vehicles than other state parameters under the same detection conditions among the state parameters relating to the ego vehicle 2a. In particular, the external environment of the surroundings of the ego vehicle 2a is substantially the same between the ego vehicle 2a and other vehicles 2b in the surroundings of the ego vehicle 2a, therefore the above-mentioned training technique of a learning model can be applied when there is an abnormality in values of a state parameter relating to the external environment in the surroundings of the ego vehicle 2a detected by a sensor 23 of the ego vehicle 2a. Such a state parameter may include, in addition to the atmospheric temperature of the surroundings of the ego vehicle 2a, for example, the humidity of the atmosphere and air pressure of the surroundings of the ego vehicle 2a.

Further, in the above embodiment, the other vehicle 2b transmits the type of the state parameter and detection conditions detected at step S11 to the server 3. However, the other vehicle 2b may also transmit the values of the state parameter and detection conditions detected at step S11 to the server 3. In this case, the values of the state parameter detected at the other vehicle 2b are stored at the storage device 32 of the server 3. Therefore, if at step S14 another vehicle 2b is identified, the server 3 does not request the other vehicle 2b to transmit the values of the abnormal state parameter, but acquires the values of the abnormal state parameter detected at the other vehicle 2b from the storage device 32.

In addition, the learning model trained in the server 3 may also be a machine learning model using a random forest, k-nearest neighbor, support vector machine, or other algorithm besides a neural network.

Second Embodiment

Figure 8:
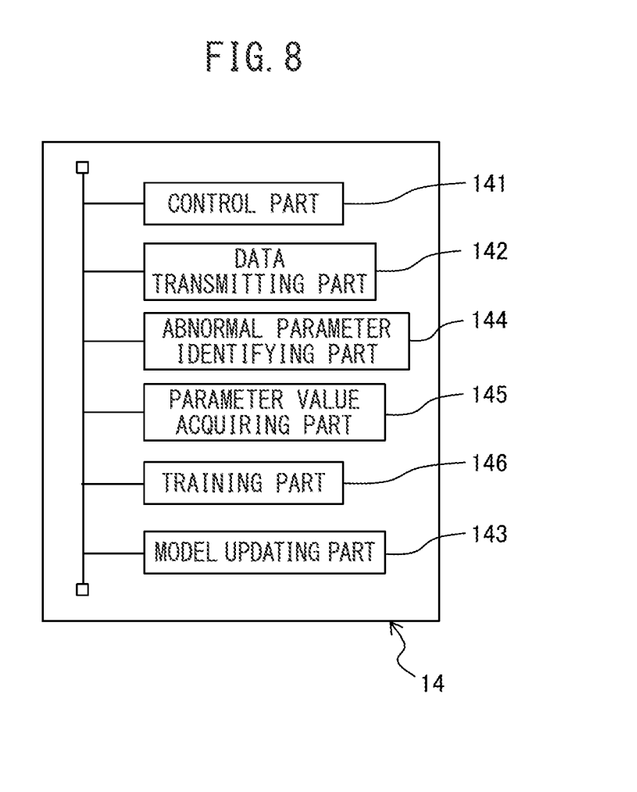
FIG. 8 is a functional block diagram of a processor of an ego vehicle.

Next, referring to FIGS. 8 to 10, the machine learning system 1 according to a second embodiment will be explained. Below, the points of difference from the machine learning system according to the first embodiment will be mainly explained.

In the present embodiment, the processor 14 of the ego vehicle 2a functions as a machine learning device for training a learning model. FIG. 8 is a functional block diagram of the processor 14 of the ego vehicle 2a according to the second embodiment. As shown in FIG. 8, the processor 14 is provided with a control part 141 using a learning model to control controlled equipment 22 of the ego vehicle 2a, an abnormal parameter identifying part 144 identifying a state parameter where an abnormality occurs among the state parameters constituting the training data sets prepared by the ego vehicle 2a, a parameter value acquiring part 145 acquiring the values of the state parameter where an abnormality occurs from another vehicle 2b different from the ego vehicle 2a, a training part 146 training the learning model, and a model updating part 143 updating the learning model used at the control part 141.

Figure 9:
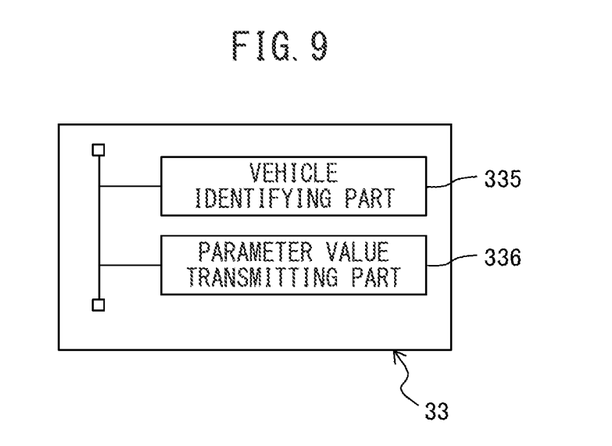
FIG. 9 is a functional block diagram of a processor of a server.

FIG. 9 is a functional block diagram of the processor 33 of the server 3 according to the second embodiment. As shown in FIG. 9, the processor 33 is provided with a vehicle identifying part 335 for identifying another vehicle 2b acquiring values of an abnormal parameter, and a parameter value transmitting part 336 transmitting values of an abnormal state parameter acquired from another vehicle 2b to the ego vehicle 2a.

Figure 10:
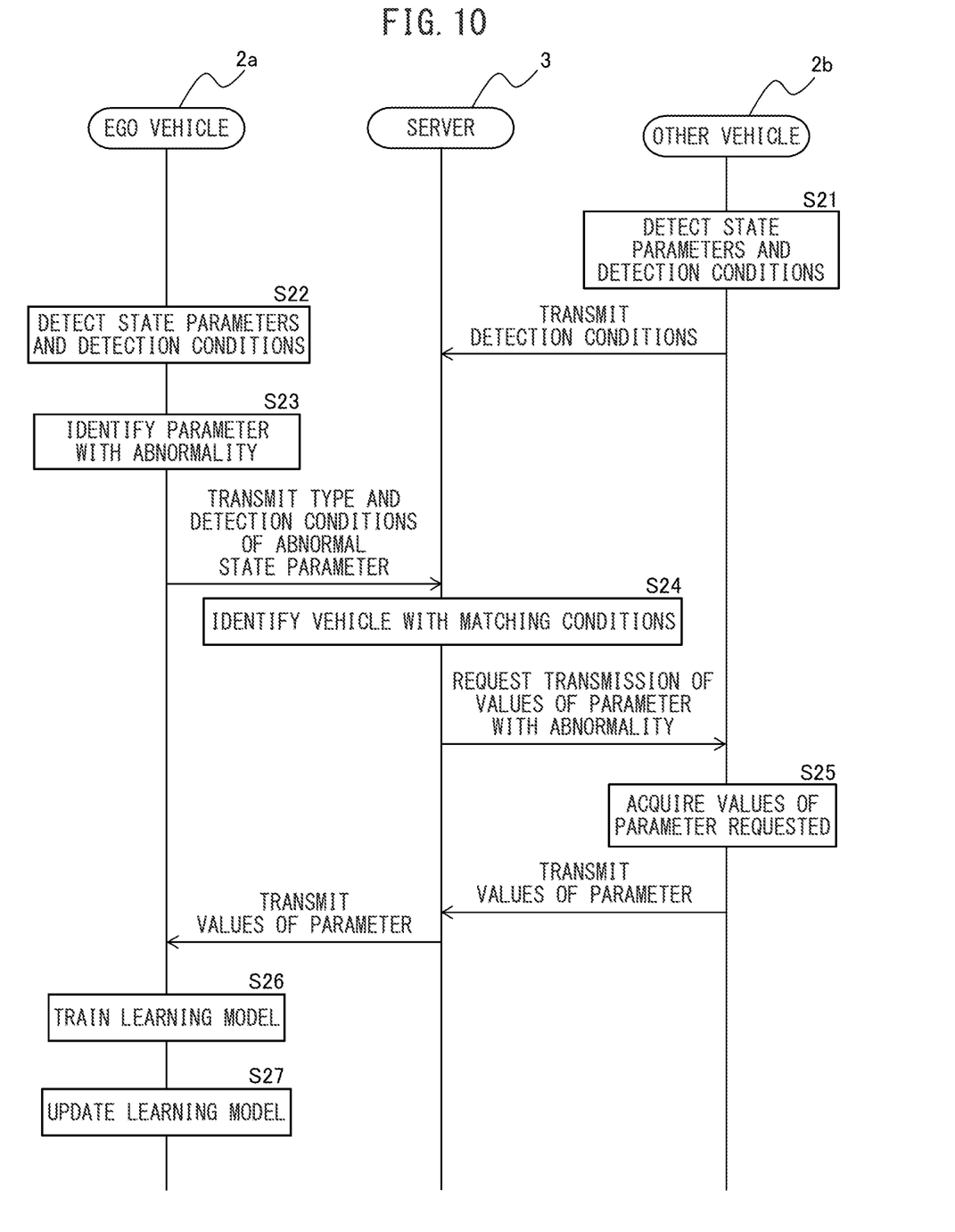
FIG. 10 is an operation sequence diagram of training processing performed by a machine learning system.

FIG. 10 is an operation sequence diagram of training processing performed by the machine learning system 1 according to the second embodiment. In particular, FIG. 10 is an operation sequence diagram at the time when training a learning model used for control of controlled equipment 22 of the ego vehicle 2a if an abnormality occurs in an outside air temperature sensor of the ego vehicle 2a.

As shown in FIG. 10, in the same way as step S11 of FIG. 7, other vehicles 2b periodically detect values of state parameters including the outside air temperature and the detection conditions at that time, and stores them in their memories 13 (step S21). Further, the data transmitting parts 142 of the processors 14 of the other vehicles 2b transmit the detection conditions and the detected types of the state parameters stored in their memories 13 every certain time interval through an external vehicle communication module 21 to the server 3.

On the other hand, in the same way as step S12 of FIG. 7, the ego vehicle 2a periodically detects values of state parameters used for training the learning model and the detection conditions at that time, and stores them in its memory 13 (step S22). If the number of the values of the state parameters required for training are detected and stored in the memory 13, the processor 14 of the ego vehicle 2a assembles the values of the plurality of state parameters stored in the memory 13 in time series to prepare training data sets.

If training data sets are prepared, the abnormal parameter identifying part 144 of the processor 14 of the ego vehicle 2a, in the same way as step S13 of FIG. 7, judges the presence of any state parameter where an abnormality has occurred in the training data sets (abnormal state parameter) and identifies the state parameter if there is an abnormal state parameter (in the present example, the outside air temperature) (step S23).

If an abnormal state parameter is identified by the abnormal parameter identifying part 144, the parameter value acquiring part 145 of the ego vehicle 2a acquires the values of the abnormal state parameter from another vehicle 2b. In particular, in the present embodiment, the parameter value acquiring part 145 acquires from another vehicle 2b the values of the abnormal state parameter detected by the other vehicle 2b under conditions matching the detection conditions when the ego vehicle 2a detected the values of the state parameter constituting part of the training data sets.

Therefore, first, if a state parameter detected by a sensor 23 is identified as abnormal, the parameter value acquiring part 145 transmits the type and detection conditions of the abnormal state parameter to the server 3.

If the type and detection conditions of the abnormal state parameter are transmitted from the ego vehicle 2a, in the same way as step S14 of FIG. 7, the vehicle identifying part 335 of the server 3 identifies another vehicle 2b acquiring values of the abnormal state parameter (step S24). The vehicle identifying part 335 searches for another vehicle 2b transmitting detection conditions matching the detection conditions when the ego vehicle 2a was detecting the values of the abnormal state parameter, among the large number of other vehicles 2b transmitting detection conditions. If identifying another vehicle 2b acquiring values of the abnormal state parameter, the vehicle identifying part 335 requests the other vehicle 2b to transmit the values of the abnormal state parameter (that is, the outside air temperature).

If requested to transmit values of the abnormal state parameter, the processor 14 of the other vehicle 2b, in the same way as step S15 of FIG. 7, acquires the values of the abnormal state parameter detected under detection conditions complying with the detection conditions of the training data sets from the memory 13 (step S25). Further, the processor 14 of the other vehicle 2b transmits the acquired values of the abnormal state parameter to the server 3. If receiving the values of the abnormal state parameter from the other vehicle 2b, the parameter value transmitting part 336 of the server 3 transmits the values of the abnormal state parameter to the ego vehicle 2a. The parameter value acquiring part 145 of the ego vehicle 2a acquires the values of the abnormal state parameter detected by the other vehicle 2b in this way through communication between the server 3 able to communicate with the other vehicle 2b and the ego vehicle 2a. Therefore, if an abnormality occurs in the values of a certain state parameter (abnormal state parameter) detected by a sensor 23, the parameter value acquiring part 145 of the ego vehicle 2a acquires the values of the abnormal state parameter detected by another vehicle 2b under conditions matching the detection conditions when the values of the abnormal state parameter included in the training data sets of the ego vehicle 2a were detected by the sensor 23.

The training part 146 of the ego vehicle 2a, in the same way as step S16 of FIG. 7, uses the training data sets prepared by the ego vehicle 2a and the values of the abnormal state parameter transmitted from the other vehicle 2b, to train the learning model (step S26). If it is judged at the abnormal parameter identifying part 144 that there is no abnormal state parameter, the training part 146 uses only the training data sets prepared by the ego vehicle 2a for training the learning model by the above-mentioned training technique. On the other hand, if an abnormal state parameter is identified in the abnormal parameter identifying part 144, the training part 146 trains the learning model by the above-mentioned training technique using training data sets including the values of the abnormal state parameter acquired from the other vehicle 2b by the parameter value acquiring part 145, instead of the values of the abnormal state parameter detected by the sensor 23 of the ego vehicle 2a. That is, the training part 146, in this case, trains the learning model using training data sets including values of the abnormal state parameter acquired by the parameter value acquiring part 145 from the other vehicle 2b and the values of other state parameters, besides the abnormal state parameter, detected by the sensors 23 of the ego vehicle 2a.

If completing the training of the learning model, the model updating part 143 of the ego vehicle 2a updates the information of the learning model stored in the memory 13 of the ego vehicle 2a (for example, the weights "w" and biases "b") (step S27). Due to this, when later using the learning model to control the controlled equipment 22, the control part 141 controls the controlled equipment 22 based on the updated learning model.

Advantageous Effects and Modifications

In the present embodiment, the ego vehicle 2a trains the learning model. If the training of the learning models of all of the vehicles 2 were performed by the server 3, the load of calculation at the server 3 would become extremely high. In this regard, in the present embodiment, since the ego vehicle 2a trains the learning model, the load of calculation at the server 3 can be reduced.

Note that, in the above embodiment, the parameter value acquiring part 145 of the ego vehicle 2a acquires the values of the abnormal state parameter detected by another vehicle 2b through communication between the server 3 able to communicate with the other vehicle 2b and the ego vehicle 2a. However, the parameter value acquiring part 145 of the ego vehicle 2a may also acquire the values of the abnormal state parameter detected by another vehicle 2b through vehicle-vehicle communication between the ego vehicle 2a and the other vehicle 2b. In this case, if acquiring the values of the abnormal state parameter from the memory 13, the processor 14 of the other vehicle 2b directly transmits the acquired values of the abnormal state parameter through vehicle-vehicle communication to the ego vehicle 2a.

Above, embodiments according to the present disclosure were explained, but the present disclosure is not limited to these embodiments and can be corrected and changed in various ways within the language of the claims.

The invention claimed is:

1. A machine learning device for training a machine learning model associated with a vehicle, the machine learning device comprises a processor, wherein the processor is configured to:
   acquire first training data from a first vehicle, the first training data including values of one or more state parameters detected by one or more detectors provided at the first vehicle;
   determine whether an abnormality occurs in the values of the one or more state parameters, the abnormality occurring when one or more of the one or more detectors does not output a signal or when an error occurs in an output of one or more of the one or more detectors; and
   upon determination that the abnormality occurs in the values of the one or more state parameters detected by at least one of the one or more detectors:
      search for a second vehicle among a plurality of vehicles transmitting the values of the one or more state parameters in which the abnormality has occurred, the second vehicle being located at a second time and a second place with a highest match among the plurality of vehicles to a first time and a first place at which the first vehicle was located when the first vehicle acquired the values of the one or more state parameters in which the abnormality occurred;
      acquire the values of the one or more state parameters in which the abnormality occurred from the second vehicle; and
      train the machine learning model using the first training data received from the first vehicle and the values of the one or more state parameters in which the abnormality has occurred received from the second vehicle.

2. The machine learning device according to claim 1, wherein
   the machine learning device is provided in the vehicle, and
   the processor is further configured to acquire the values of the one or more state parameters in which the abnormality occurs from the second vehicle by vehicle-vehicle communication with the second vehicle or by communication with a server able to communicate with the second vehicle.

3. The machine learning device according to claim 1, wherein
   the machine learning device is provided at a server able to communicate with the first vehicle and the second vehicle, and the processor is further configured to transmit information of the machine learning model trained by the processor to the first vehicle,
   the processor is further configured to acquire, from the second vehicle, the values of the one or more state parameters in which the abnormality occurs by communication between the second vehicle and the server, and
   the processor is further configured to use second training data, the second training data including the values of the one or more state parameters in which the abnormality occurs acquired from the second vehicle and the values of other state parameters relating to the first vehicle transmitted from the first vehicle by communication between the first vehicle and the server to train the machine learning model.

4. The machine learning device according to claim 1, wherein the one or more state parameters in which the abnormality occurs are state parameters relating to an external environment of the first vehicle.

5. The machine learning device according to claim 4, wherein the one or more state parameters in which the abnormality occurs include at least one of atmospheric temperature, atmospheric humidity, and atmospheric pressure of the surroundings of the vehicle.

* * * * *